May 4, 1965

L. R. AXELROD 3,181,791

AUTOMATIC COMFORT CONTROL SYSTEM

Filed March 9, 1960

INVENTOR.
Leslie R. Axelrod
BY
Byron Hume Green & Clement
Attys.

United States Patent Office 3,181,791
Patented May 4, 1965

3,181,791
AUTOMATIC COMFORT CONTROL SYSTEM
Leslie R. Axelrod, Highland Park, Ill., assignor to The Powers Regulator Company, Skokie, Ill., a corporation of Illinois
Filed Mar. 9, 1960, Ser. No. 13,779
3 Claims. (Cl. 236—44)

The present invention relates to a control system for arrangements adapted to be regulated in accordance with a plurality of variables and particularly to a control system for providing regulation to any one of a plurality of variable physical conditions definable by a system of equations for single valued functions. By the term "equations for single valued functions" is meant an equation for which there is but one solution for each unknown.

An example of such a control system is one for maintaining acceptable environments for plant and animal life as by controlling the operation of an air conditioning system to acceptable levels of temperature and humidities. Specifically, experimentation has indicated that the human body experiences varying degrees of comfort at different temperatures and humidities. From this experimental data, there has been plotted a scale of comfort indices including a band defining temperatures and humidities of optimum comfort. Stated precisely, the body can, within a given range of temperatures, have the sensation of the same "effective temperature," or the same sense of comfort, at any temperature within that range if at the same time the humidity of that environment is properly adjusted to the temperature. The converse is also true. That is, within a given range of humidities, the body can have the same sense of comfort if at the same time the temperature of the environment is properly adjusted to the humidity. Thus, there can be defined by a multivariable equation a multiplicity of coordinate temperatures and humidities defining an "effective temperature," any one of which an environment can be controlled.

It is a general object of the invention to devise and provide a control system responsive to a plurality of mathematically definitive conditions for regulating an environment to any one of the definitive conditions in accordance with the actual conditions sensed therein.

A further object of the invention is to provide a new and improved control system responsive to a plurality of variables for providing regulation to any one of a plurality of preferred coordinate variable conditions.

Another object of the invention is to provide a new and improved control system for maintaining a substantially constant effective temperature in a controlled environment.

A further object of the invention is to provide a new and improved control system for maintaining a substantially constant effective temperature by controlling both temperature and humidity within a sensed environment in a manner so as to utilize the temperature and humidity control equipment to maximum efficiency by minimum usage.

A specific object of the invention is to provide a new and improved control system for maintaining a substantially constant effective temperature within an environment and including equipment for varying and controlling the humidity within the environment, equipment for varying and controlling the temperature within the environment, a humidity sensor device and a temperature sensor device both located within the controlled environment for providing output signals in accordance with the sensed temperature and the sensed humidity, and a comfort zone computer for independently controlling the humidity control system and the temperature control system in accordance with the sensed temperature signal and sensed humidity signal, respectively.

Further objects and features of the invention relate to the particular structures and arrangements whereby the above identified objects and other objects of the invention are achieved.

The invention, both as to its construction and method of operation, will be understood by reference to the following specification and drawings, forming a part thereof, wherein.

It is understood that the broad purposes and objects of this invention can be most easily understood and exemplified by considering the easily imaginable problem of affecting temperature and humidity control in an environment such as a building. In this exemplary display, it is not meant to limit the scope of the invention to a control system for providing a constant effective temperature, because, as the explanation progresses, it will be easily understood that the control system could be utilized for regulation of multivariables to any mathematically definitive circumstance whether a line or a plane. Proceeding then to the exemplary circumstance of a temperature and humidity controller.

Figure 1:
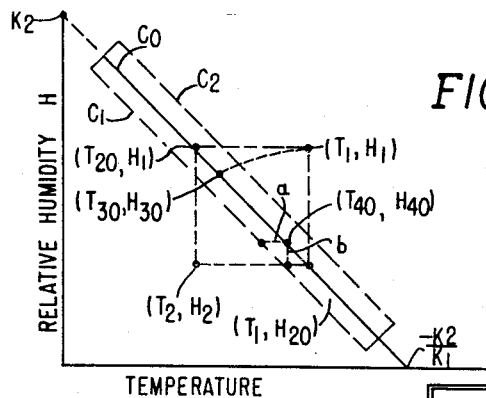
FIGURE 1 is a plot of temperatures and humidities defining a comfort zone of substantially constant effective temperatures.

Considerable work has been done in plotting the comfort indices for the human body, and such a comfort zone chart, plotting comfort against temperature and humidity, is exemplified by the chart of FIGURE 1. The area enclosed by the figure represents what to the normal human being is an optimum environmental comfort zone, indicating that the human body can be comfortable for a broad band of temperatures and corresponding humidities.

The comfort zone control contemplated strives to adjust either or both temperature and relative humidity so as to maintain the controlled environment within the comfort zone of effective temperatures. The system for accomplishing this purpose can be considered a multivariable optimizing control system. It is multivariable because it is controlled in accordance with a complex algebraic equation in which one or more output variables are controlled by one or more input variables. The system is optimizing in that it operates to control the temperature and humidity generating equipment for maximum response with minimum operation.

Figure 2:
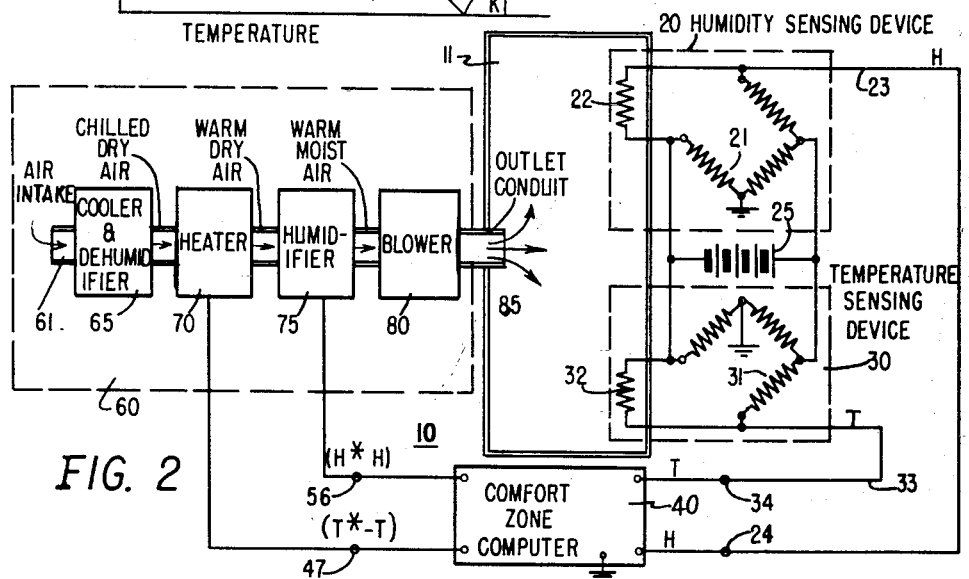
FIGURE 2 is a block schematic representation of a control system in accordance with the invention.

Referring specifically to the arrangement 10 shown in FIGURE 2, there is shown therein a closed environment 11, which may be a small room or building of considerable dimension, for example, air treating apparatus 60 and a computer unit 40.

The environment 11 is provided with treated air through a conduit 85 extending from the apparatus 60 and includes therein at least the sensing elements of the humidity sensing device 20 and of the temperature sensing device 30.

Within the air treatment apparatus 60 there is included a cooler and dehumidifier 65 provided with a supply of air through an intake conduit 61, an air heater 70, a humidifier 75, and a blower 80. The cooler and dehumidifier 65 may be a conventional piece of air-conditioning apparatus wherein the air is chilled and accordingly, dehumidified to the moisture saturation level of the chilled air. This chilled dry air is applied from the cooler and dehumidifier 65 to the heater unit 70. The latter unit is provided, for example, with electrical heating coils or steam radiating equipment and is controlled from the comfort zone computer 40 so as to heat the chilled dry air to the temperature directed by the computer 40. The warm dry air from the heater 70 is then applied to the humidifier unit 75, also controlled from the computer 40. The humidifier 75 can be, for example, a steam spray chamber controlled directly from the computer 40 for adding to the warm dry air the amount of moisture as directed from the computer. The warm moist air from the humidifier 75 is then applied through the blower 80 and to the conduit 85 extending into the closed environment 11.

Giving consideration to the humidity sensing device 20, it may include, for example, the bridge balance circuit 21 including in one arm thereof a humidity sensitive resistor 22, of any suitable type, and provided with a D.C. input source 25. The output from the sensing device 20 may be applied to a conductor 23 extending to the humidity input terminal 24 of the computer 40.

The temperature sensing device 30 includes a resistance bridge 31 provided with a temperature responsive resistor 32 of any suitable type and a D.C. input voltage from the source 25. The output from the temperature sensing device 30 is applied via the conductor 33 to the temperature input terminal 34 of the computer 40.

The bridge 21 of the humidity sensing device 20 and the bridge 31 of the temperature sensing device 30 may both be arranged, for example, to be balanced at the lowest practical humidity and temperature expected to be sensed by the resistors 22 and 32, respectively. Thus there will always be directional signals at the terminals 24 and 34, tending to give a direct indication of relative humidity and temperature within the closed environment 11.

Figure 3:
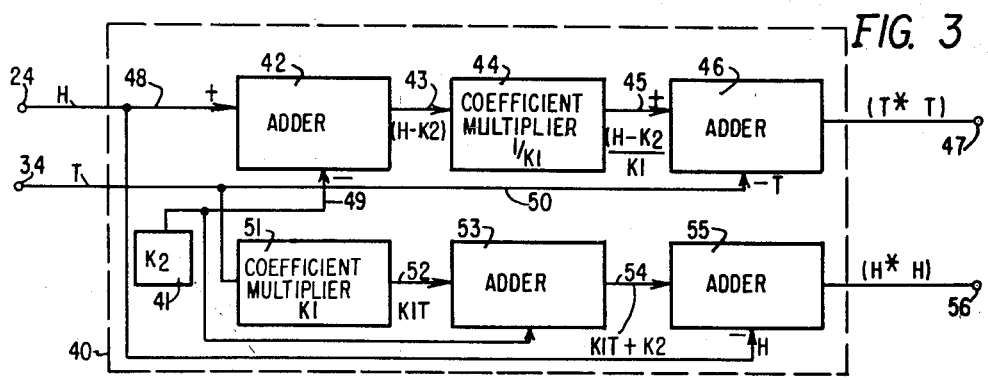
FIGURE 3 is a schematic representation of a comfort zone computer as set forth in FIGURE 2.

The comfort zone computer 40 is shown schematically in the arrangement of FIGURE 3. Generally, the computer is arranged to provide a relative humidity output signal and a temperature output signal in accordance with the error found to exist between the sensed humidity and the preferred relative humidity, and the sensed temperature and the preferred temperature within the closed environment 11. The temperature that is preferred will depend upon the relative humidity existent and vice versa, relative humidity preferred will depend upon the temperature existent. Both of these variables are selected so as to achieve a feeling of comfort for the human located within the closed environment.

Actually, the comfort of the human body is achieved when the body temperature is made constant as by the heat loss being equal to the heat produced therein. The heat loss from the body may be by radiation, conduction, and evaporation which are controlled respectively by temperature, air motion and the relative humidity in the closed environment. It is true that the body can experience the same sense of comfort for a variety of different temperatures and corresponding relative humidities. For the present the matter of air movement is not considered, inasmuch as this is considered to be maintained constant. In this circumstance the combination of temperature and humidity which produce the same feeling of comfort are considered thermo-equivalent conditions and are generally referred to as "effective temperatures" or "comfort indices." Each effective temperature or comfort index can be expressed by an equation defining a line. While in actual practice the line is curved, it can be approximated by a straight line $C_0$ defined by the equations:

(1) $\qquad H_0 = K1 T_0 + K2$ (2) $\qquad T_0 = (H_0 - K2)/K1$ where $H_0$ is a comfort humidity, $T_0$ is a corresponding comfort temperature, $K1$ is a constant and $K2$ is a different constant. The comfort zone computer 40 is designed to conform to the equations.

Referring specifically to FIGURE 3 there is shown therein, in schematic form, the components of the computer 40. Included therein is a source of bias potential 41, an adder unit 42, a coefficient multiplier 44, and an adder 46 designed to provide in composite a signal in accordance with Equation 1. Further, the computer includes a coefficient multipler 51, an adder 53, and an adder 55 adjusted to operate in conjunction with the bias source 41 to provide an output signal in accordance with the Equation 2.

Specifically, the relative humidity signals from the humidity sensing device 20 are applied to the input terminal 24 and directed via the conductor 48 to the adder unit 42. Therein the bias signal from the source 41 and extended via the conductor 49, is subtracted from the humidity signal and applied via the conductor 43 to the function multiplier 44. The difference signal on the conductor 43 is multiplied in the coefficient multiplier 44 by the coefficient $1/K1$ and that product is applied via the conductor 45 to an adder unit 46. In the adder 46 the product provided by the conductor 45 is diminished by the amount of the temperature signal derived from the temperature sensing device 30 as applied to the input terminal 34 and extended via the conductor 50 to the adder 46. The resulting signal from the adder 46 appears at the output terminal 47 and represents the temperature error between the sensed temperature and the preferred temperature for the sensed relative humidity.

The temperature signals from the input terminal 34 are applied via the conductor 57 to the coefficient multiplier 51 and multiplied by the coefficient $K1$. The output therefrom is applied via the conductor 52 to the adder 53, which product is added to the bias signal derived from the source 41. The sum of these signals is applied via the conductor 54 to the adder 55 and has subtracted therefrom the signal corresponding to the relative humidity signal provided at the input terminal 24 and extended via the conductor 59. The output from the adder circuit 55 is extended and applied to the output terminal 56. The signal appearing at the terminal 56 is in accordance with the Equation 1 and is a difference signal indicating the difference between the sensed relative humidity and the relative humidity corresponding to the sensed temperature.

Assuming in the circumstances set forth above that the humidity sensing device 20 and the temperature sensing device 30 are both oriented to provide a signal greater than the minimum, then the heater unit 70 and the humidifier 75 will be controlled directly in accordance with the size of the output signal at the terminals 47 and 56, respectively. Accordingly, the heater and humidifier will be operated in a manner so as to tend to establish within the closed environment 11 the temperature and a relative humidity which will reduce the output signals at the terminals 56 and 47 to zero.

Giving specific consideration to the manner in which the system operates and assuming that within the air treatment apparatus 60 the cooler and dehumidifier 65 are a constant operating device and the blower 80 is a constant operating device, there will, in the absence of operation of the heater unit 70 and the humidifier 75, be supplied to the closed environment 11 chilled dry air moving at a substantially constant velocity. In the environment 11 the humidity sensing device 20 and the temperature sensing device 30 will sense the conditions and provide corresponding signals at the terminals 24 and 34 indicative of the humidity and temperature conditions within the environment. Referring now to FIGURE 1, and assuming, for example, that the temperature and humidity sensed is not on the comfort index $C_0$ but is rather a condition defined as $(T_1, H_1)$ above the comfort index $C_0$. By operation of the comfort zone computer 40 the signal at the output terminal 47 is $(T_{20} - T_1)$ where $T_{20}$ is the temperature on the comfort index $C_0$ for the humidity $H_1$ and the output signal at the terminal 56 is $(H_{20} - H_1)$ where $H_{20}$ is the humidity on the comfort index $C_0$ for the temperature $T_1$. Thus, the output signals at the terminals 47 and 56 are of negative polarity. In this circumstance, the heater 70 is controlled to diminish the amount of heat being inserted into the air, and the humidifier 75 is controlled to diminish the amount of moisture being inserted into the air. The amount of control depends upon the magnitude of the signals. In the absence of a humidifier control the heater would tend to drive the system to provide a temperature and humidity condition ($T_{20}$, $H_1$). Similarly in the absence of the heater control, the humidifier would operate to drive the system to provide a temperature and humidity condition ($T_1$, $H_{20}$). Inasmuch as both the humidifier and the heater are operative, the system will work towards the nearest condition that will provide the zero output signals at the terminals 47 and 56. Accordingly, should it be the type of system in which the temperature is more easily changed than the humidity, it is believable that the system would tend to drive towards the condition ($T_{20}$, $H_1$). But at the same time the humidity conditions would be changing so that the system would go towards and probably end up at a condition such as $T_{30}$, $H_{30}$).

Giving consideration to the circumstances in which the humidity sensing device 20 and the temperature sensing device 30 should detect a condition such as ($T_2$, $H_2$) below the comfort index $C_0$, as shown in FIGURE 1, the computer 40 would be operated to provide output signals at the terminals 47 and 56 of the same magnitude as provided under the above identified circumstances, but of the opposite and positive polarity. In this condition the heater 70 is operated to increase the temperature to $T_{20}$ and the humidifier 75 is operated to increase the humidity to $H_{20}$. Again, the system would drive towards a condition set in the computer and might very well establish itself ultimately at a temperature humidity circumstance defined by ($T_{40}$, $H_{40}$).

The ideal operation of the system has been explained. It is appreciated that this is a feed back control system and that such systems generally tend to overshoot and to hunt about a desired condition. In this instance hunting and overshoot is not objectionable within certain defined limits inasmuch as the preferred effective temperature or the optimum comfort index for the human body knows a degree of tolerance. Accordingly, and truly the preferred comfort for the human system is best defined not by a line, but by an area within the comfort indices $C_1$ and $C_2$ located on either side of the comfort index line $C_0$. Thus in utilizing a computer arranged to be responsive to a line equation and by making the heater control and the humidifier control of something less than ultimate sensitivity, it is possible to control the comfort condition in the environment 11 within boundaries such as those defined by the comfort index lines $C_1$ and $C_2$. For such a circumstance, the heater 70, for example, would be responsive to signals of the amount greater only than the quantity $a$, and the humidifier 75 would be responsive to different signals of an amount greater than $b$ as shown in FIGURE 1. Thus there would be a tendency for the system to drift within limits about the conditions defined by the line $C_0$ and maintain comfort conditions acceptable to the human body.

In view of the foregoing it is clear that there has been provided herewith a new and improved arrangement for maintaining a condition of acceptable comfort within a closed environment. The comfort so established is variable over a range of comfort indices and within these comfort indicies variable over a wide range of temperature and humidity conditions. The primary advantage of the system is that for variant temperature and humidity conditions, it is possible to control the temperature and humidity variables independently and jointly to that extent that each or both are most susceptible to control thereby to achieve the highest efficiency in environment control.

While the control system has been explained in terms of temperature and humidity variables and corresponding temperature and humidity control, it is understood that the rate of air movement is another factor that contributes to the determination of "effective temperature." In the present explanation, the rate of air movement has been considered to be a constant because in most practical air conditioning arrangements, this is true. But it is within the broad contemplation of this invention that rate of air movement can be made variable and can be employed compatibly in a circumstance where only the temperature is varied or where only the humidity is varied or where additionally both temperature and humidity are varied. In the first two circumstances, the equation for operation of the computer will remain substantially in the form as that set forth in the body of the specification. In the latter circumstance of three variables, it is understood that the equation would also be subject to three variables easily ascertainable from effective temperature charts. In the circumstance of the three variables, the computer would independently control the heater, the humidifier and the blower to achieve the optimum preferred conditions. This operation can be easily interpolated from the manner and nature of operation described herein.

It is to be understood that the nature of the variables is not important, it being important only that the variables can be detected, that control signals can be provided from the detection and that the condition to which control is to be effected is definable by a mathematical equation to which the control circuit system might be adapted.

From the foregoing, it is understood that this description is but exemplary of the general principles of the invention and that others skilled in the art can devise easy variations and modifications thereof. Accordingly, it is intended to cover in the appended claims all such variations and modifications as fall within the true spirit and scope of the invention.

I claim:

1. In an arrangement for controlling a first physical condition and a second physical condition and a third physical condition including the temperature and the humidity and the rate of movement of a mass of air in an enclosed environment and provided with first conditioner means for regulating a first physical condition of said mass of air, second conditioner means for regulating a second physical condition of said mass of air, and third conditioner means for maintaining a third physical condition of said mass of air; the combination of a control system for said arrangement comprising means for sensing a first physical condition of said mass of air, means for sensing a second physical condition of said mass of air, means responsive to each one of a multiplicity of sensed first physical conditions for determining a preferred second physical condition, means responsive to each one of a multiplicity of second physical conditions for determining a preferred first physical condition, means for deriving a first signal from the difference between said sensed first physical condition and said preferred first physical condition, means for deriving a second signal from the difference between said sensed second physical condition and said preferred second physical condition, means for applying said first signal to said first conditioner means for regulating the first physical condition of said mass of air, and means for applying said second signal to said second conditioner means for regulating the second physical condition of said air mass, whereby said first conditioner means and said second conditioner means are continuously directed to reduce said first signal and said second signal to a predetermined minimum.

2. In an arrangement for controlling a first physical condition and a second physical condition and a third physical condition including the temperature and the humidity and the rate of movement of a mass of air in an enclosed environment and provided with temperature conditioning means for regulating the temperature of said mass of air, humidity conditioning means for regulating the humidity of said mass of air, and a blower for maintaining the rate of movement of said mass of air, the combination of a control system for said arrangement comprising temperature sensing means for providing a temperature output signal corresponding to the temperature of the mass of air in said environment, humidity sensing means for providing humidity output signal corresponding to the humidity of the mass of air in said environment, a source of a first coefficient signal, means for deriving a first sum signal from said humidity output signal and from said first coefficient signal, first means for multiplying said first sum signal by the inverse of a constant to derive a first product signal corresponding to a preferred temperature signal, second means for multiplying said temperature output signal by a constant to derive a second product signal, means for deriving from said second product signal and said first coefficient signal a second sum signal corresponding to a preferred humidity signal, means for deriving a first control signal from the difference between said first product signal and said temperature output signal means for deriving a second control signal from the difference between said second sum signal and said humidity output signal, means for applying said first control signal to said temperature conditioning means to regulate the temperature of said mass of air in accordance with the polarity and magnitude of said signal, and means for applying said second control signal to said humidity conditioning means to regulate the humidity of said mass of air in accordance with the polarity and magnitude of said signal, whereby said temperature conditioning means and said humidity conditioning means are continuously directed to reduce said first control signal and said second control signal to a predetermined minimum and the temperature and humidity of the mass of air in said environment is controlled to a preferred temperature and humidity condition.

3. In an arrangement for controlling a first physical condition and a second physical condition and a third physical condition including the temperature and the humidity and the rate of movement of a mass of air in an enclosed environment and provided with temperature conditioning means for regulating the temperature of said mass of air, humidity conditioning means for regulating the humidity of said mass of air, and a blower for maintaining the rate of movement of said mass of air, the combination of a control system for said arrangement comprising temperature sensing means for providing a temperature output signal T corresponding to the temperature of the mass of air in said environment, humidity sensing means for providing a humidity output signal H corresponding to the humidity of the mass of air in said environment, a source of first coefficient signal $K2$, means for deriving a first sum signal $(H-K2)$ from said humidity output signal and the negative of said first coefficient signal, first means for multiplying said first sum signal by a coefficient $1/K1$ to derive a first product signal $$\left(\frac{H-K2}{K1}\right)$$

corresponding to a preferred temperature signal, second means for multiplying said temperature output signal by a coefficient $K1$ to derive a second product signal $(K1T)$, means for deriving from said second product signal and said first coefficient signal a second sum signal $(K1T+K2)$ corresponding to a preferred humidity signal, means for deriving a first control signal from the difference between said first product and said temperature output signal, means for deriving a second control signal from the difference between said second sum signal and said humidity output signal, means for applying said first control signal to said temperature conditioning means to regulate the temperature of said mass of air in accordance with the polarity and magnitude of said signal, and means for applying said second control signal to said humidity conditioning means to regulate the humidity of said mass of air in accordance with the polarity and magnitude of said signal, whereby said temperature conditioning means and said humidity conditioning means are continuously directed to reduce said first control signal and said second control signal to a predetermined minimum and the temperature and humidity of the mass of air in said environment is controlled to a preferred temperature and humidity condition.

References Cited by the Examiner
UNITED STATES PATENTS

| | | | |
|---|---|---|---|
| 1,231,570 | 7/17 | Cramer et al. | 236—44 |
| 2,086,258 | 7/37 | Crosthwait | 236—44 |
| 2,190,344 | 2/40 | Woodling | 234—44 |
| 2,538,192 | 1/51 | Fantini | 236—44 |
| 2,628,606 | 2/53 | Draper | 123—102 |
| 2,837,286 | 6/58 | Ross | 236—44 |
| 2,946,943 | 7/60 | Nye et al. | |
| 3,011,718 | 12/61 | Joerren et al. | 236—1 |
| 3,070,301 | 12/62 | Sarnoff. | |

OTHER REFERENCES

Amber et al.: Pages 43 thru 47 of "Automatic Control" for May 1958.

"Automatic Control" for October 1958, pages 48 thru 53.

Eckman et al.: "Optimizing Control of a Chemical Process," Control Engineering September 1957 (pages 197–204).

Frady et al.: "System Characteristics of a Computer Controller for Use in the Process Industries," Proceedings of the Eastern Joint Computer Conference, 1957 (pp. 40–45.)

EDWARD J. MICHAEL, *Primary Examiner.*

FREDERICK L. MATTESON, JR., ALDEN D. STEWART, *Examiners.*